United States Patent [19]

Arroyo et al.

[11] Patent Number: 4,807,962
[45] Date of Patent: Feb. 28, 1989

[54] OPTICAL FIBER CABLE HAVING FLUTED STRENGTH MEMBER CORE

[75] Inventors: Candido J. Arroyo, Lithonia; Benjamin C. Ellis, Snellville, both of Ga.

[73] Assignees: American Telephone and Telegraph Company, AT&T Bell Laboratories, Murray Hill; AT&T Technologies, Inc., Berkeley Heights, both of N.J.

[21] Appl. No.: 65,689

[22] Filed: Jun. 17, 1987

Related U.S. Application Data

[63] Continuation-in-part of Ser. No. 845,920, Mar. 6, 1986.

[51] Int. Cl.$^4$ ................................................. G02B 6/44
[52] U.S. Cl. ................................................. 350/96.23
[58] Field of Search ................................................. 350/96.23

[56] References Cited

U.S. PATENT DOCUMENTS

| | | |
|---|---|---|
| 353,680 | 12/1885 | Hurlbut . |
| 2,340,926 | 2/1944 | Bradley ................................. 138/77 |
| 2,929,408 | 3/1960 | Weatherwax et al. . |
| 3,110,754 | 11/1963 | Witort et al. ........................... 174/70 |
| 3,958,861 | 5/1976 | Roberts et al. ....................... 350/96 C |
| 4,154,049 | 5/1979 | King et al. ............................. 57/9 |
| 4,172,746 | 10/1979 | Le Noane et al. ..................... 156/91 |
| 4,195,468 | 4/1980 | King et al. ............................. 57/9 |
| 4,199,224 | 4/1980 | Oestreich .......................... 350/96.23 |
| 4,205,899 | 6/1980 | King et al. ........................ 350/96.23 |
| 4,235,511 | 11/1980 | Yonechi ............................ 350/96.23 |
| 4,256,146 | 3/1981 | Genini et al. ......................... 138/111 |
| 4,361,381 | 11/1982 | Williams ........................... 350/96.23 |
| 4,388,800 | 6/1983 | Trezequet et al. ..................... 57/7 |
| 4,389,088 | 6/1983 | Trezequet ......................... 350/96.23 |
| 4,401,366 | 8/1983 | Hope ................................ 350/96.23 |
| 4,422,889 | 12/1983 | Trezequet et al. ..................... 156/70 |
| 4,474,426 | 10/1984 | Yataki ............................... 350/96.23 |
| 4,491,386 | 1/1985 | Negishi et al. .................... 350/96.23 |
| 4,596,443 | 6/1986 | Diemeer et al. ................... 350/96.23 |

FOREIGN PATENT DOCUMENTS

| | | |
|---|---|---|
| 2511019 | 9/1976 | Fed. Rep. of Germany . |
| 2538565 | 6/1984 | France . |
| 0026841 | 2/1977 | Japan ............................... 350/96.23 |
| 59-192205 | 10/1984 | Japan . |

OTHER PUBLICATIONS

D. Boscher et al., "Optical Fiber Cables Using V-Grooved Cylindrical Units: High Performance Cables", *Fiber and Integrated Optics*, vol. 4, No. 1.

*Primary Examiner*—Gene Wan
*Attorney, Agent, or Firm*—Edward W. Somers

[57] ABSTRACT

An optical fiber cable includes a fluted strength member core (22) which comprises a plurality of ribs (26—26) extending radially from a center portion and a plurality of grooves (28—28), each groove being disposed between two adjacent ribs. The fluted core is such that the ratio of the diameter of a circle (41) which passes through an outermost surface of each rib to the diameter of a circle (44) through the inverts of the grooves does not exceed a predetermined value and cooperates with a reference width of each rib to allow a plurality of optical fibers to be disposed in each groove. Further, the geometry of the fluted core is such that the optical fibers are capable of longitudinal and lateral movement in the grooves. A core wrap (50) which may be made of a flame retardant material encloses the fluted core and a jacket (60) which is made of a plastic material encloses the core wrap.

16 Claims, 4 Drawing Sheets

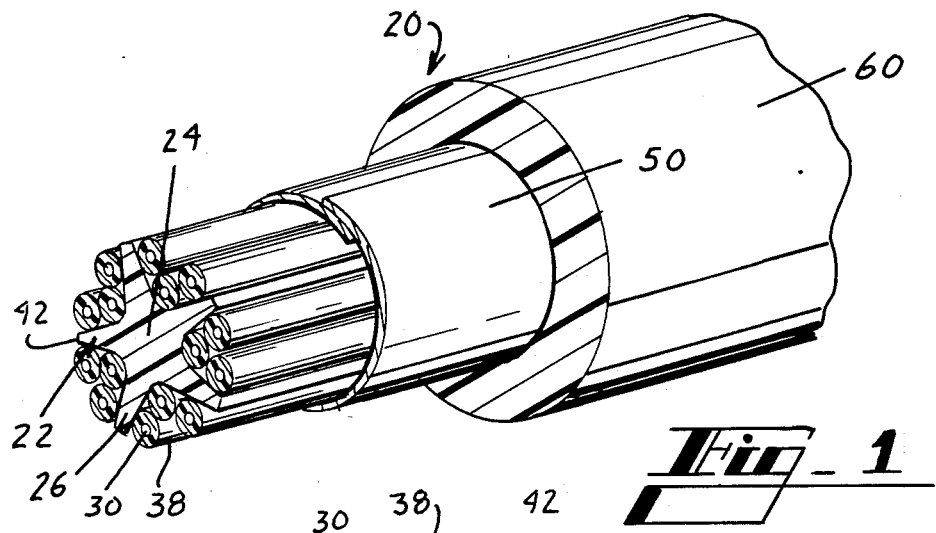
Fig_1
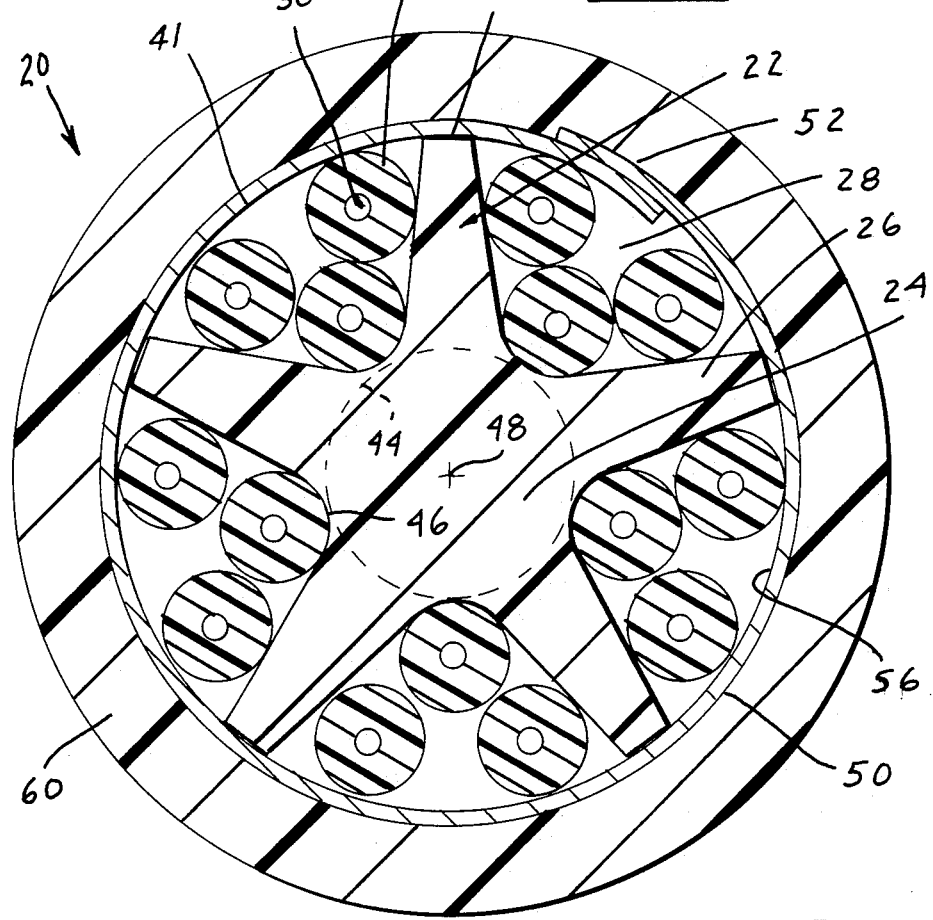
Fig_2

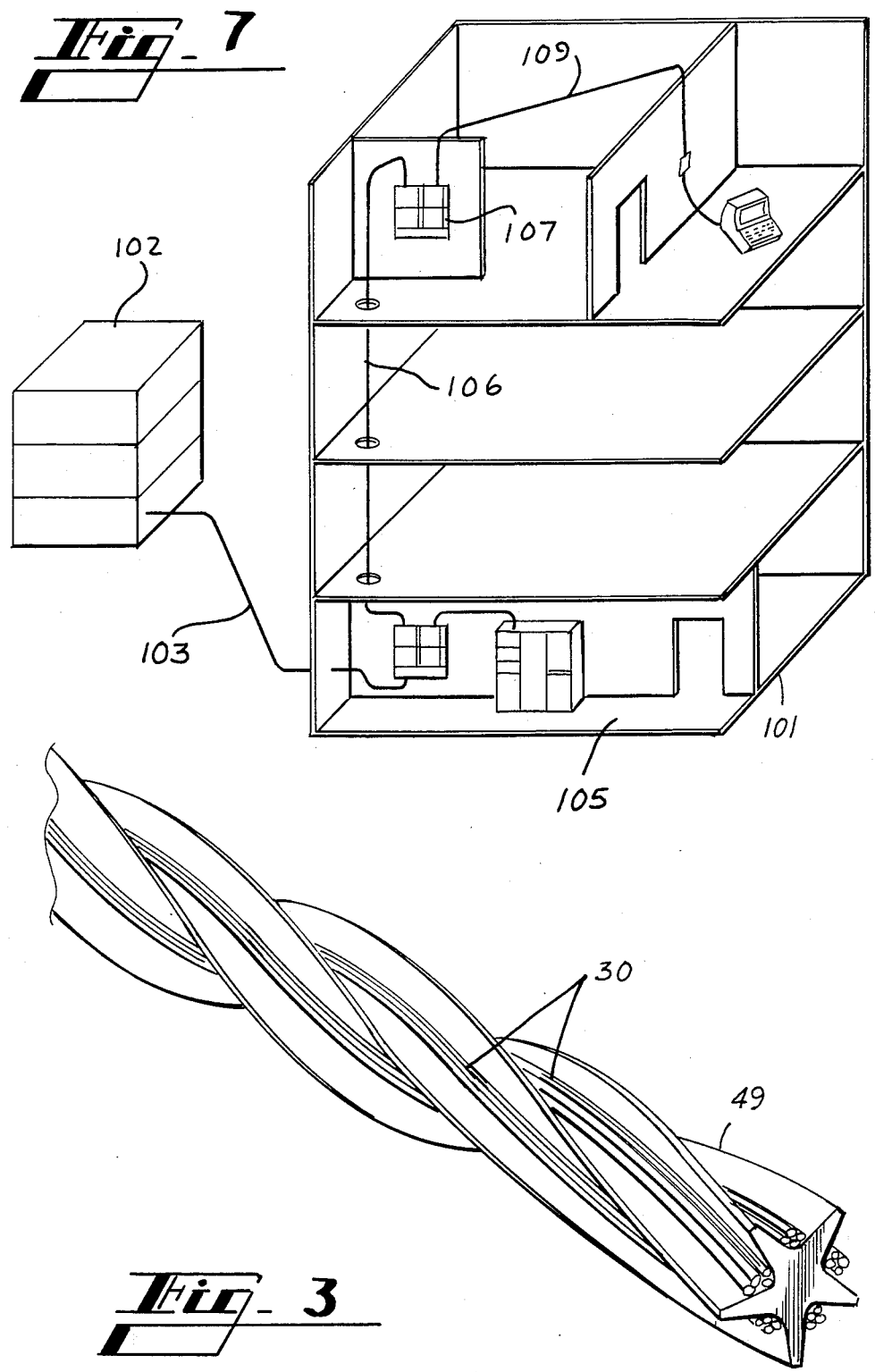

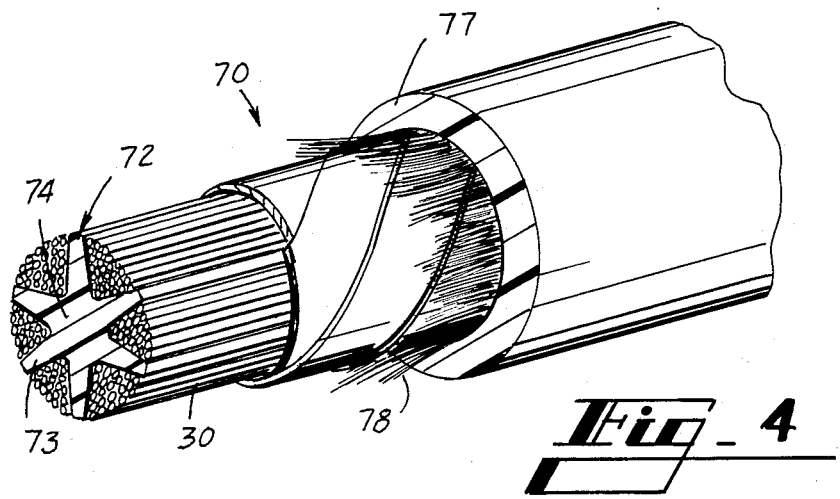
Fig_4
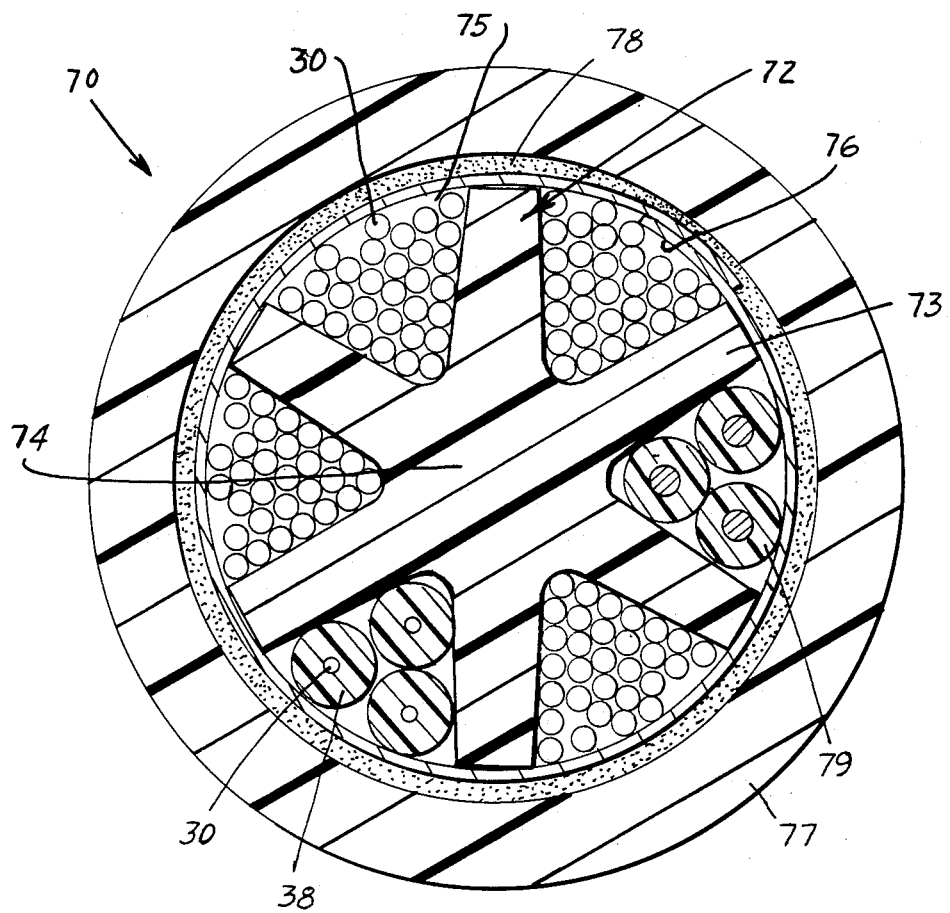
Fig_5

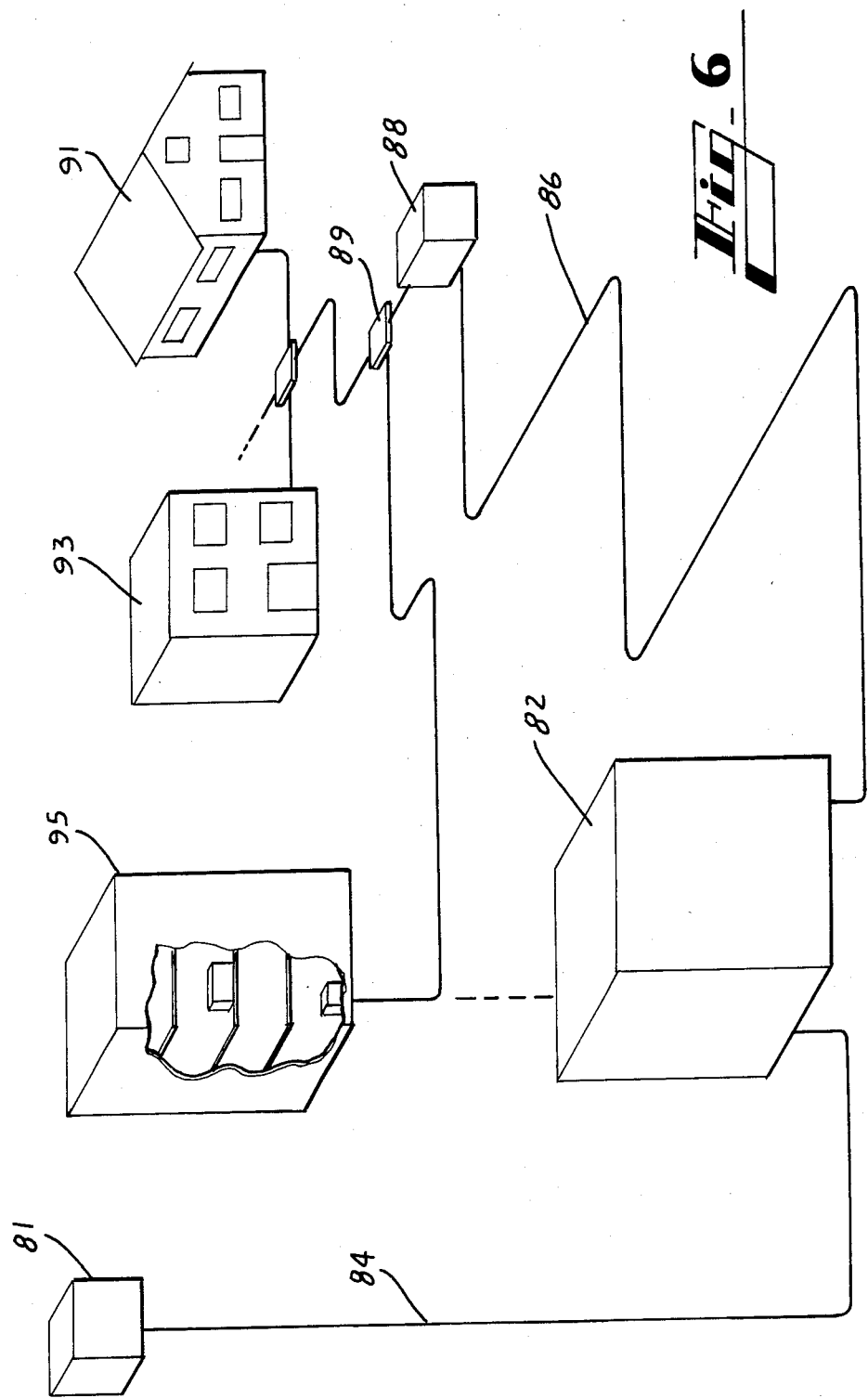

OPTICAL FIBER CABLE HAVING FLUTED STRENGTH MEMBER CORE

This application is a continuation-in-part, of application Ser. No. 845,920, filed Mar. 26, 1986.

TECHNICAL FIELD

This invention relates to an optical fiber cable. More particularly, it relates to an optical fiber cable including a fluted core which provides strength for the cable as well as compartments for groups of optical fibers.

BACKGROUND OF THE INVENTION

Optical fibers are in widespread use today as transmission media because of their large bandwidth capabilities and small size. However, they are mechanically fragile, exhibiting low strain fracture under tensile loading and degraded light transmission when bent. Accordingly, cable structures have been developed to protect mechanically the optical fibers thereby rendering them a realizeable transmission medium.

Developments in the optical fiber communications field have been rapid. However, the technology still is undergoing major shifts in direction. For example, earlier generation fiber systems were designed to operate at wavelengths of about 0.8 $\mu$m, and current systems operate at 1.3 $\mu$m. Now there is growing interest in systems having an operating wavelength of about 1.55 $\mu$m to take advantage of the loss window that exists in silica-based optical fiber in that wavelength region. Another example of a major shift which is driven by demand for higher bandwidths is that from multimode to single mode fibers.

Although desired for their large bandwidth capabilities and small size, light-transmitting optical fibers are mechanically fragile, exhibiting low-strain fracture under tensile loading and degraded light transmission when bent. The degradation in transmission which results from bending is known as microbending loss. As a result, cable structures have been developed to protect mechanically the optical fibers in various environments.

A cable for use in a duct must be capable of withstanding tensile loads applied when the cable is pulled into the duct and stresses caused by bends. Cable structures which have been developed for optical fibers include loose tube, stranded and ribbon cables. For a description of loose tube cables, see, for example, D. Lawrence and P. Bark "Recent Developments in Mini-Unit Cable" published at pp. 301–307 of the Proceedings of the 32nd International Wire and Cable Symposium, 1983. See also U.S. Pat. No. 4,153,332.

Ribbon cable comprises a core including one or more ribbons with each including a plurality of optical fibers disposed generally in a planar array. The core is surrounded by a loose-fitting plastic inner tubular jacket. In one ribbon cable, a plastic outer jacket is reinforced with strength members which are encapsulated in the outer jacket to achieve coupling therewith.

In some situations, especially duct systems which include many bands such as those in loop plant in urban areas, relatively high tensile loads are expected. An improved optical communications cable which is suitable for such use is disclosed in U.S. Pat. No. 4,241,979 which issued on Dec. 30, 1980 in the names of P. F. Gagen and M. R. Santana. A bedding layer, about which strength members are wrapped helically, is added between plastic extruded inner and outer jackets to control the extent to which the strength members are encapsulated by the outer jacket. The cable includes two separate layers of strength members, which are wrapped helically in opposite directions. Under a sustained tensile load, these two layers of strength members produce equal but oppositely directed torques about the cable to insure the absence of twisting.

In another type of optical communications cable, a plurality of optical fibers are enclosed in an extruded plastic tube to form a unit and a plurality of these tubed units are enclosed in a common extruded plastic tube which is enclosed in a sheath system. Generally, the optical fibers which are enclosed in each unit tube are stranded together about a central strength member. A central strength member is used because it is relatively easy to assemble into the cable. Also, the cable is more easily bent if it has a central strength system rather than strength members which are incorporated into the sheath system. However, when such a cable is bent, the central strength member may in some instances compress one or more of the fibers against the tube and causes damage thereto.

Generally, optical fiber cables of the prior art, such as stranded and loose tube, suffer from the disadvantage of having the stranded units or the tubes manufactured on a separate line. In stranded cable, for example, a plurality of units which priorly have been enclosed individually in tubes and stranded are fed into a line which applies the common tube and the outer jacket. Each of the units must be made separately on another line and inventoried until a plurality of them can be associated together in the common tube. Because the core is generally stranded with a predetermined lay, its manufacture and the assembly of the tubes into the core involves the use of relatively heavy rotating apparatus which is undesirable from a manufacturing standpoint.

Clearly, what has been needed is a cable for optical fiber transmission which departs from those used in the past. That cable should be one which can be made inexpensively relative to present costs and which is relatively compact. Also, the cable structure should be one which inhibits the introduction of undue stresses which would lead to microbending losses in the optical fibers.

A cable which satisfies these needs is disclosed in Appl. Ser. No. 721,533 which was filed on Apr. 10, 1985, in the names of C. H. Gartside III, A. J. Panuska, and P. D. Patel. That cable includes a plurality of optical fibers which are assembled together without intended stranding to form units which extend in a direction along a longitudinal axis of the cable. A length of tubing which is made of a plastic material encloses the plurality of units and is parallel to the longitudinal axis of the cable. The ratio of the cross-sectional area of the plurality of optical fibers to the cross-sectional area within the tube does not exceed a predetermined value. A sheath system includes strength members and a jacket which is made of a plastic material and which encloses the length of tubing.

Although the above-described cable meets the aforementioned needs, efforts have continued to find alternatives which may be even less costly. This is particularly true for cable needs in buildings, both riser and plenum applications, and in loop distribution cables. Of course, if the sought-after cable is to be used as a riser cable or a plenum cable, it must have suitable smoke and flame retardant properties.

Interest has been shown in fluted core optical cables. In those, a fluted core which is made of a plastic material includes a plurality of ribs projecting radially from a center portion and a plurality of grooves with each groove being disposed between two adjacent grooves. One or more optical fibers is positioned in each of the grooves.

Prior art fluted core design cables have used cores which may be made of plastic materials such as polyvinylidene fluoride (PVDF), or polyvinyl chloride (PVC) for example. Because of the relatively low tensile strength of those kinds of fluted croes, it was found necessary to include a centrally disposed strength member within the fluted core or to wrap strength members such as ones made of KEVLAR ® yarn about the exterior of the fluted core. Both remedies for the tensile strength problem add to the cost of the cable by requiring additional steps in its manufacture.

Further, what is desired is a totally dielectric cable. Such a cable which could be run from building closets to service distribution points would obviate the need for grounding connections at splice points which add to the cost of the cable installation.

Seemingly, the prior art does not include an optical fiber cable which is adaptable to a variety of environments and which includes a simplified strength member arrangement. The sought after cable should be one that may be manufactured inexpensively and that may accommodate a plurality of optical fibers in a totally dielectric structure.

SUMMARY OF THE INVENTION

The foregoing problems of the prior art have been overcome by the fluted strength member core cable of this invention. The cable includes a carcass in the form of a fluted core which is made of a glass fiber material held together in a matrix material such as epoxy or urethane. It should be clear that the fluted core comprises a plurality of ribs extending radially from a center portion and a plurality of grooves with each groove being disposed between two adjacent ribs. A plurality of optical fibers may be disposed in each groove. The ratio of the diameter of a circle which passes through an outer surface of each rib to the diameter of a circle which passes through inverts of the grooves does not exceed a predetermined value. That value and the width of each groove are such that each groove is capable of holding a plurality of optical fibers with each fiber being capable of longitudinal and lateral movement along the length of the cable. In a preferred embodiment, a core wrap encloses the fluted core. A jacket which is made of a plastic material encloses the fluted core and optical fibers.

The fluted core may be twisted along its length whereupon the optical fibers when positioned in the grooves have a lay. Inasmuch as the glassy fibers can only stretch so much without incurring damage, it becomes important that the fibers are as close to the neutral axis of the cable as is possible. Advantageously, in this embodiment, the geometry of the fluted core is such that the fibers in each groove tend to be disposed toward the center portion of the fluted core.

Further, the fluted core is made of a material which has a relativley low coefficient of friction. This allows the fibers to move independently of the fluted core and prevents damage to them during bending.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of a cable of this invention;

FIG. 2 is an end sectional view of the cable of FIG. 1;

FIG. 3 is a perspective view of another fluted core in which grooves thereof have a lay;

FIG. 4 is a perspective view of another cable of this invention;

FIG. 5 is an end sectional view of another cable of this invention;

FIG. 6 is a schematic view which shows environments in which the cable of this invention may be used; and FIG. 7 is a schematic view of a building or campus in which cables of this invention may be used.

DETAILED DESCRIPTION

Referring now to FIGS. 1 and 2, there is shown an optical fiber cable which is designated generally by the numeral 20. As can be seen in the drawings, the cable includes a fluted strength member 22 which is somewhat star-shaped. It is commonplace to refer to the fluted strength member 22 as a fluted core. The fluted core 22 includes a center portion 24 and a plurality of radially extending ribs 26—26. The ribs 26—26 are formed so that a groove 28 is formed between each two adjacent ribs of the fluted core.

The fluted core 22 is made of a high strength material which provides excellent mechanical properties for the cable 20. For example, the fluted core strength member 22 may be made of glass fiber material in which the fibers are held together by a matrix material such as an epoxy resin or a polyurethane plastic material.

Disposed in each of the grooves 28—28 are a plurality of optical fibers 30—30. Each of the optical fibers 30—30 includes a core and a cladding with a coating disposed thereover. The outer diameter of the clad core is generally about 125 microns, whereas the outer diameter of the coated optical fiber is about 250 microns. In the embodiment shown in FIGS. 1 and 2, the coated optical fiber 30 is buffered. This characterization is intended to mean that the coated optical fiber is enclosed in an outer jacket 38 of plastic material such as, for example, a polyvinyl chloride (PVC) plastic material.

Also, of importance is the geometry of the fluted core 22. The ratio of the diameter of a circle 41 (see FIG. 2) which passes through outer ends 42—42 of the ribs 26—26 to the diameter of a circle 44 which circumscribes the inverts 46—46 of the grooves 28—28 should not exceed a predetermined value. That value for the embodiment shown in FIGS. 1 and 2 is about 2.6. If the value exceeds about 2.6, there may be problems with the stability of the outer portions of the ribs. Of course, the ratio must be such that the grooves between the ribs are sufficient in cross-sectional area to accommodate the number of optical fibers which are destined to be placed therein.

Further of importance to the geometry of the fluted core is the width of each of the ribs 26—26. The width of each of the ribs at a reference location such as along the inner circle 44 may vary depending on the number of ribs. For example, the width along the reference ends for each rib of a five rib core is generally more than that for a six star core. As can be seen in FIG. 2, the width of each of the ribs along the reference circle 41 is less than that of the reference width along the inner circle 44.

The width of each rib is such that it cooperates with the above-identified ratio to allow a plurality of buffered or unbuffered optical fibers 30—30 to become disposed in each of the grooves 28—28. Further, the ratio and the width of each of the ribs 26—26 along the reference circle are such that the optical fibers 30—30 are capable of longitudinal and lateral movement within the grooves 28—28.

Also, a fluted core 49 may be twisted (see FIG. 3) so that the optical fibers which are positioned in grooves between ribs have a lay. In that event, at least some of the optical fibers 30—30 in each groove become disposed toward a longitudinal axis 48 (see FIG. 2) of the fluted core. As a result, some of the optical fibers bend toward the neutral axis of the cable 20 which, of course, from a bending standpoint offers less chance for damage to the cable. The twisting of the fluted core 49 may be accomplished to cause each of the grooves to have a lay or a reverse oscillated lay.

Enclosing the fluted core 22 and the optical fibers 30—30 in each of the grooves 28—28 is a core wrap which is designated by the numeral 50 (see again FIGS. 1 and 2). The core wrap 50 is applied in tape form to the fluted core 22 such that it is wrapped longitudinally with a longitudinal overlapped seam 52. As can be seen in FIG. 2, the core wrap 50 is disposed about the fluted core such that an inner surface 56 thereof is in engagement with the outer ends 42—42 of the ribs 26—26.

The core wrap 50 may be made of any of a number of materials. For example, should the cable be used within a building such as in a riser or plenum installation, the use a core wrap material which is substantially smoke and flame retardant is mandated. This may be accomplished by making the core wrap 50 of a woven glass material, for example, which may be impregnated with a fluoropolymer material, for example.

In order to provide protection for the fluted core 22 and the core wrap 50, a jacket 60 is extruded about the core wrap. The jacket 60 is made of a plastic material which may be polyvinyl chloride, for example. Of course, if the cable 20 is to be used in a building in riser or plenum installations, it may be important to make the jacket of a flame retardant material such as polyvinylydene fluoride plastic material.

In one example cable of FIGS. 1 and 2, the fluted core 22 was made of glass fiber impregnated with an epoxy material. The inner circle 44 had a diameter of 0.080 inch and the outer circle 41 had a diameter of 0.210 inch. The fluted core 22 was enclosd with a Fluorglas ® tape which had a thickness of 0.003 inch and which was supplied by the Oak Materials Group Inc. Over the core wrap was extruded a plastic jacket which was made of polyvinyl chloride and which had a thickness of 0.040 inch.

Going now to FIGS. 4 and 5, there is shown another embodiment of a cable of this invention. The cable which is designated generally by the numeral 70 includes a fluted core 72 which includes a plurality of ribs 73—73 which extend from a center portion 74. The fluted core 72 includes six ribs as opposed to the five of the cable 20 of FIGS. 1 and 2. Formed between each two adjacent ones of the ribs 73—73 is a groove 75 which is adapted to receive a plurality of the optical fibers 30—30. The fluted core 72 is enclosed by a core wrap 76 which may be smoke and flame retardant and a plastic jacket 77. It should be observed that the optical fibers 30—30 in the embodiment shown in FIG. 4 and in some of the grooves of FIG. 5 are not buffered and as such have a substantially smaller outer diameter than those shown in FIGS. 1 and 2. In this embodiment, as in the one shown in FIGS. 1 and 2, the ratio of the diameter of a circle which passes through outer ends of ribs to a circle which passes through inverts of the grooves does not exceed the predetermined value of about 2.6. Strands 78—78 of Kevlar ® yarn which may be applied over the core wrap 76 are used to connect the cable to an apparatus cabinet (not shown).

In one example cable of FIG. 4, the fluted core 72 was made of glass fiber impregnated with an epoxy material. An inner circle which passed through the inverts of the grooves 75—75 had a diameter of 0.047 inch whereas the diameter of a circle which passed through outer ends of the ribs 73—73 had a diameter of 0.125 inch. The fluted core 72 was enclosed with a 0.003 ich thick core wrap comprising a Fluorglas ® tape as supplied by Oak Materials Group, Inc. A polyvinyl chloride jacket 77 was extruded about the core wrap. The fluted core of this embodiment and of that of the example of FIGS. 1 and 2 each had in tension an average strength of 430 lbs. at 1% strain and an ultimate strength of 1154 lbs.

Advantageously, the fluted core arrangement of this invention compartmentalizes the optical fibers 30—30 into groups which facilitates splicing operations. Each optical fiber of the cable is disposed in a predetermined one of the compartments which facilitates the location of optical fibers by a craftsperson for splicing. Not only does the fluted core serve to compartmentalize the optical fibers, but also it may be used to segregate optical fibers 30—30 and insulated metallic conductors 79—79, or to segregate unbuffered optical fibers, metallic conductors and buffered optical fibers (see FIG. 5).

Another advantage of the cables of this invention also relates to splicing. When it is desired to splice into one of these cables, it is only necessary to remove the jacket and core wrap to expose the conductors to be spliced. The fluted core which not only compartmentalizes the conductors into groups but which also is the primary strength member remains intact. In other commercially available cables, strength members which are disposed about the conductors core must be removed to access ones of the conductors.

Also, as should be apparent, the cable of this invention may be totally dielectric, unless of course, it becomes necessary to position metallic conductors in one or more of the grooves of the fluted core. A totally dielectric cable is desirable in that the need for carrying a ground connector across a splice, for example, becomes unnecessary.

Theuseof the optical fiber cables may be explained by referring to FIG. 6. As can be seen, a central office 81 is connected to another central office 82 by a trunk or long haul cable 84. The other central office 82 through a buried loop feeder 86 provides communication service to an above-ground terminal 88 or to splice points 89—89. From the above-ground terminal 88 and the splice points, service is provided along cables to residences 91—91, small buisnesses 93—93 and to high rise buildings 95—95 through what is referred to as a local area network (LAN). The cables of this invention may be used from the central office to any of the residences, small businesses, or buildings through the above-ground terminals and splice cases.

It is commonplace in buried cables, such as those in local area networks, to fill the cables with a waterblocking material. For the fluted core cables of this invention, a waterblocking material is provided in each of the grooves of the fluted core strength member. Some of the waterblocking materials in use do not yield under strains experienced when these cables are made or handled. This prevents the movement of the optical fibers within the grooves of the fluted core and the fibers buckle because they contact, with a relatively small periodicity, a surface of the unyielding filling material. This problem also may be overcome by using a grease-like filling compositions having a relatively low critical yield stress such as one disclosed in application Ser. No. 697,054 filed on Jan. 31, 1985, in the names of C. H. Gartside III et al.

Referring now to FIG. 7, there is shown a building 101 which is connected to another building 102 in a campus environment, for example. A cable 103 enters the building 101 and is routed into an equipment room 105 where optical cross connections are made to an optical fiber riser cable 106 which is routed through floors of the building. The optical riser cable 106 is routed to an apparatus closet 107 whre cross connections are made to an optical fiber plenum cable 109. The plenum cable 109 provides service to outlets in rooms to which are connected various kinds of user equipment.

In the event that the optical fiber cable of this invention is to be used in a plenum or as a riser as shown in FIG. 7, the core wrap and the jacket must be made of materials which include relatively high smoke and flame retardance. As should be readily apparent, the cables of this invention include a core common to each except for changes in geometry and a core wrap and jacket which are tailored to specific needs.

It is understood that the above-described arrangements are simply illustrative of the invention. Other arrangements may be devised by those skilled in the art which will embody the principles of the invention and fall within the spirit and scope thereof.

What is claimed is:

1. An optical fiber cable, which comprises:
   a plurality of optical fibers;
   a fluted member which provides suitable tensile and compressive strength for the cable and which comprises a plurality of ribs extending radially from a central portion of said fluted member to provide a plurality of grooves each of which is disposed between two adjacent ribs with said optical fibers being disposed in said grooves, the ratio of the diameter of a circle that passes through outer ends of said ribs to the diameter of a circle that passes through the inverts of the grooves not exceeding a predetermined value which is sufficiently low to provide stability for said ribs and which is sufficiently high to cooperate with the spacing between adjacent ribs to allow a plurality of said optical fibers to be disposed in each groove and to be capable of longitudinal and transverse movement therein, further, the width of each rib as measured along the periphery of the circle that passes through the inverts of the grooves being substantially greater than the width of said each rib as measured along the periphery of the circle that passes through the outer ends of the ribs and being sufficient in value to strengthen and prevent rupture of each rib at its juncture with said central portion of said fluted member; and
   a sheath system which encloses said fluted member.

2. The optical fiber cable of claim 1, wherein said ratio is about 2.6.

3. The optical fiber cable of claim 1, wherein said sheath system includes a jacket which is made of a plastic material.

4. The optical fiber cable of claim 3, wherein said sheath system also includes a core wrap which is disposed between said jacket and said fluted strength member.

5. The optical fiber cable of claim 4, wherein said core wrap comprises a material which has a relatively high smoke and flame retardance.

6. The optical fiber cable of claim 5, wherein said core wrap comprises a woven glass material.

7. The optical fiber cable of claim 6, wherein the woven glass core wrap is impregnated with a plastic material.

8. The optical fiber cable of claim 1, wherein said grooves of said fluted strength member are layless along the length of said optical fiber cable.

9. The optical fiber cable of claim 1, wherein said fluted strength member is such that said grooves each have a predetermined lay along the length of said optical fiber cable.

10. The optical fiber cable of claim 1, wherein said fluted strength member comprises a material which has a predetermined tensile strength.

11. The optical fiber cable of claim 10, wherein said fluted strength member comprises a glass fiber material which is held together in a matrix.

12. The optical fiber cable of claim 11, wherein said matrix comprises an epoxy material.

13. The optical fiber cable of claim 11, wherein said matrix comprises a urethane material.

14. The optical fiber cable of claim 1, wherein said cable includes a plurality of units of optical fibers with each one of said units being disposed in one of said grooves.

15. The optical fiber cable of claim 1, wherein at least one optical fiber is positioned in at least one of said grooves and an insulated metallic conductor is positioned in at least one of said grooves.

16. The optical fiber cable of claim 1, wherein a waterblocking material is disposed in each of said grooves to encapsulate the at least one optical fiber therein.

* * * * *